(12) United States Patent
Olsen et al.

(10) Patent No.: US 8,042,151 B2
(45) Date of Patent: Oct. 18, 2011

(54) APPLICATION CONTEXT BASED ACCESS CONTROL

(75) Inventors: Geir Olsen, Wayzata, MN (US); Lee C. Spiesman, Fargo, ND (US); Michael D. Smith, Horace, ND (US)

(73) Assignee: Microsoft Corporation, Redmond, WA (US)

( * ) Notice: Subject to any disclaimer, the term of this patent is extended or adjusted under 35 U.S.C. 154(b) by 1114 days.

(21) Appl. No.: 11/312,828

(22) Filed: Dec. 20, 2005

(65) Prior Publication Data

US 2007/0143823 A1 Jun. 21, 2007

(51) Int. Cl.
*H04L 29/00* (2006.01)
(52) U.S. Cl. ............ 726/2; 713/182; 713/183; 713/184; 713/185; 713/186
(58) Field of Classification Search ................ 726/2–21; 713/182–186
See application file for complete search history.

(56) References Cited

U.S. PATENT DOCUMENTS

| | | | | |
|---|---|---|---|---|
| 5,903,720 | A * | 5/1999 | Stokes | 726/4 |
| 6,195,685 | B1 | 2/2001 | Mukherjee et al. | 709/205 |
| 6,308,273 | B1 * | 10/2001 | Goertzel et al. | 726/9 |
| 6,377,994 | B1 * | 4/2002 | Ault et al. | 709/229 |
| 6,715,077 | B1 | 3/2004 | Vasudevan et al. | 713/191 |
| 7,231,661 | B1 * | 6/2007 | Villavicencio et al. | 726/4 |
| 2002/0004909 | A1 * | 1/2002 | Hirano et al. | 713/200 |
| 2002/0166052 | A1 * | 11/2002 | Garg et al. | 713/182 |
| 2002/0188869 | A1 | 12/2002 | Patrick | 713/201 |
| 2003/0076955 | A1 * | 4/2003 | Alve et al. | 380/201 |
| 2003/0084331 | A1 | 5/2003 | Dixon et al. | 713/200 |
| 2003/0225697 | A1 | 12/2003 | DeTreville | 705/51 |
| 2004/0250107 | A1 | 12/2004 | Guo | 713/200 |
| 2005/0055578 | A1 | 3/2005 | Wright et al. | 713/201 |
| 2005/0182958 | A1 | 8/2005 | Pham et al. | 713/200 |
| 2007/0133806 | A1 * | 6/2007 | Asano | 380/277 |

FOREIGN PATENT DOCUMENTS

| | | |
|---|---|---|
| EP | 1378813 | 7/2004 |
| WO | WO2005/076726 | 8/2005 |
| WO | WO2005/096147 | 10/2005 |

OTHER PUBLICATIONS

"Context-Based Security Policies: A New Modeling Approach" by Brezillon, Patrick and Mostefaoui, Ghita Kouadri. Proceedings of the Second IEEE Annual Conference on Pervasive Computing and Communications Workshops (PERCOMW'04) 0-7695-2106-1/04 © 2004 IEEE.

"Context-Based Secure Resource Access in Pervasive Computing Environments" by Anand Tripathi, Tanvir Ahmed, Devdatta Kulkarni, Richa Kumar, and Komal Kashiramka. Department of Computer Science, University of Minnesota, Minneapolis, MN 55455, prior to Oct. 21, 2005.

(Continued)

*Primary Examiner* — Nasser Moazzami
*Assistant Examiner* — Ghazal Shehni
(74) *Attorney, Agent, or Firm* — Westman, Champlin & Kelly, P.A.

(57) ABSTRACT

A context based access control system that includes a set of one or more authorization contexts that are activated in response to selection of different functions or tasks or other functional boundary object of an application program. The authorization contexts are associated with one or more access policies that are invoked in response to activation of the one or more authorization contexts.

20 Claims, 7 Drawing Sheets

OTHER PUBLICATIONS

"A Role and Context Based Security Model" by Yolanta Beresnevichiene. University of Cambridge, Computer Laboratory, Jan. 2003. pp. 1-89.

"Context-based Security Management for Multi-Agent Systems" by Rebecca Montanari, Alessandra Toninelli and Jeffrey M. Bradshaw. Dipartimento di Elettronica, Informatica e Sistemistica (DEIS), University of Bologna and institute for Human and Machine Cognition (IHMC), prior to Oct. 21, 2005.

"A Generic Framework for Context-Based Distributed Authorizations" by Ghita Kouadri Mostefaoui and Patrick Brezillon. P. Blackburn et al. (Eds.): Context 2003, LNAI 2680, pp. 204-217, 2003. © Springer Verlag Berlin Heidelberg 2003.

Sygate Secure Enterprise—http://www.sygate.com/products/sygate-secure-enterprise.htm. Sygate Acquired by Symantec. Oct. 21, 2005.

* cited by examiner

APPLICATION CONTEXT BASED ACCESS CONTROL

BACKGROUND

Many users can access business or other information through applications over a local or wide area network. Some information generated by an application contain sensitive information, such as payroll data or credit information. Other information is general. Businesses or other organizations want to limit access to sensitive information, such as credit information or payroll information to a select group of users, yet provide unrestricted access to general information.

Effective security would grant access to information based upon application of one or more criteria, such as time of day, location, task and the role of the user in relation to the information requested. Systems that control access based upon a user's function or role are not sensitive to the functions or information structure of the application program. Access control applied directly on the object is not sensitive to the functional context (task) in which the access happens. Discretionary Access lists control access to files and directories based upon an authorized user list. Once the right is granted, the right typically applies regardless of the task or function activated by the user.

The discussion above is merely provided for general background information and is not intended to be used as an aid in determining the scope of the claimed subject matter.

SUMMARY

Access control for an application program using a set of authorization contexts is described. As described, one or more authorization contexts from a set of authorization contexts are activated in response to selection of a particular application function or task. In embodiments described, the authorization contexts are developed using a hierarchical framework to provide a hierarchy of authorization contexts that models the functional structure and boundaries of an application program.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
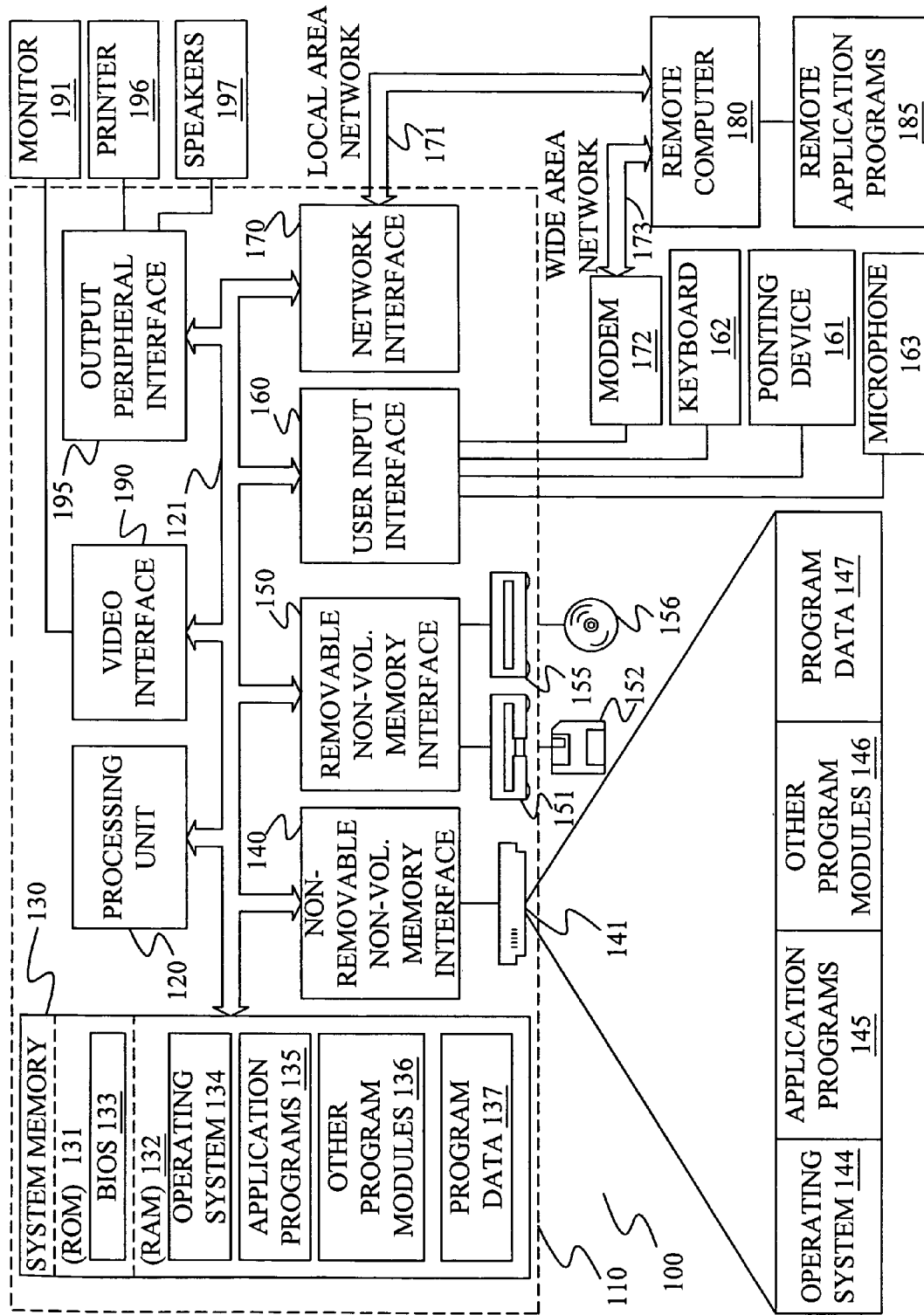
FIG. 1 is a diagram of one illustrative embodiment of a computing environment in which embodiments of access control using authorization contexts can be applied.

FIG. 1 illustrates an example of a suitable computing system environment 100 on which embodiments may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

Embodiments are operational with numerous other general purposes or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices.

With reference to FIG. 1, an exemplary system for implementing some embodiments includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
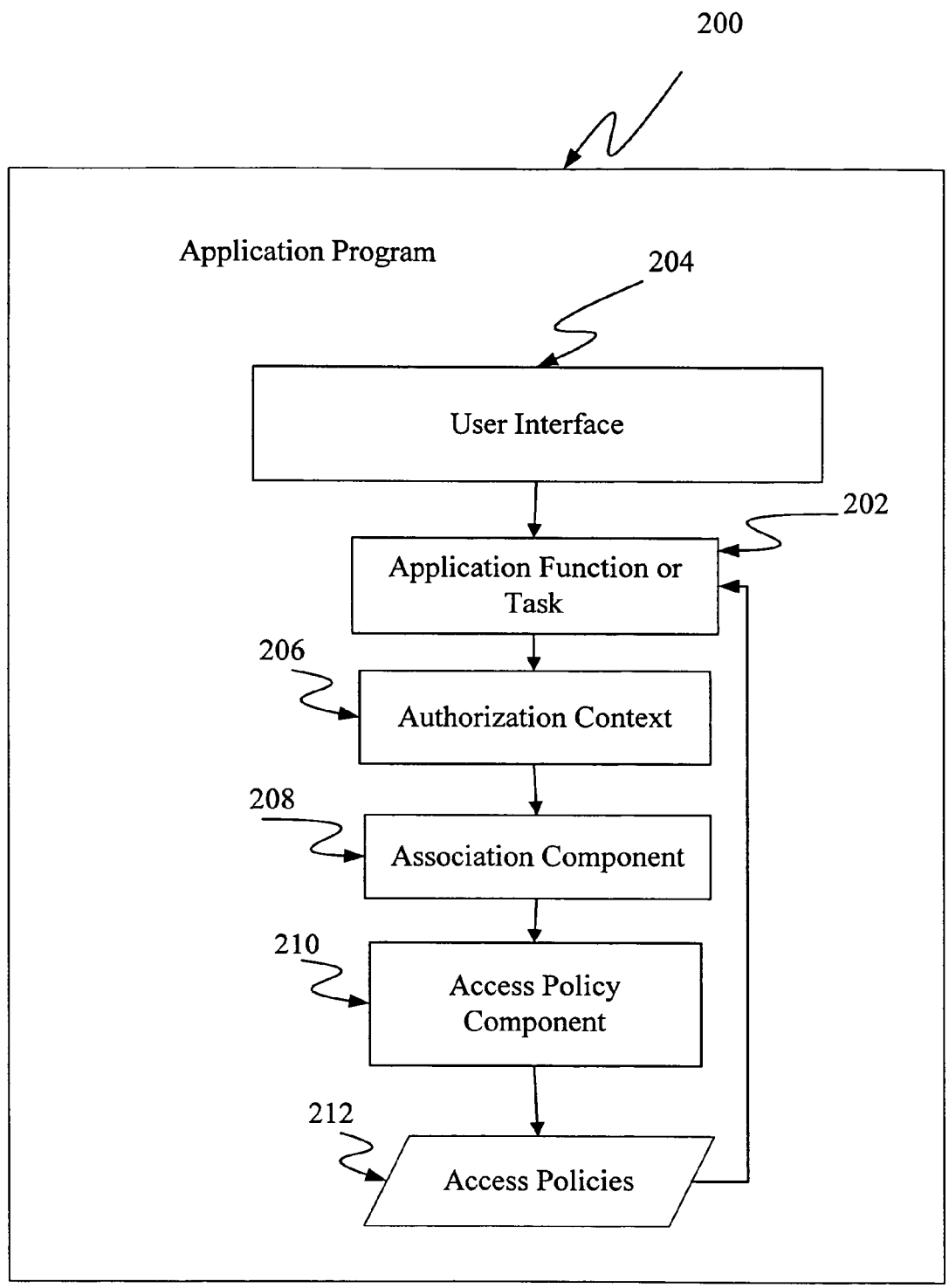
FIG. 2 is a block diagram illustrating an embodiment of an application including an access policy module to invoke one or more access policies based upon an authorization context.

FIG. 2 illustrates an embodiment of an application program 200 that operates in the computer environment of FIG. 1. Illustratively, the application program includes one or more application functions or tasks 202 that are invoked through a user interface 204 to access information or application directories of the application. The application 200 includes one or more authorization contexts 206 associated with the application function or task 202 which are activated in response to selection of the function or task 202.

Also as shown, the application includes an association component 208 and an access policy component 210. The association component 208 is configured to associate the active authorization context 206 with one or more access policies 212. The associated access policies are invoked through the access policy component 210. The invoked access policies 212 provides rules governing access to information and tasks while the authorization context 206 is active.

Figure 3:
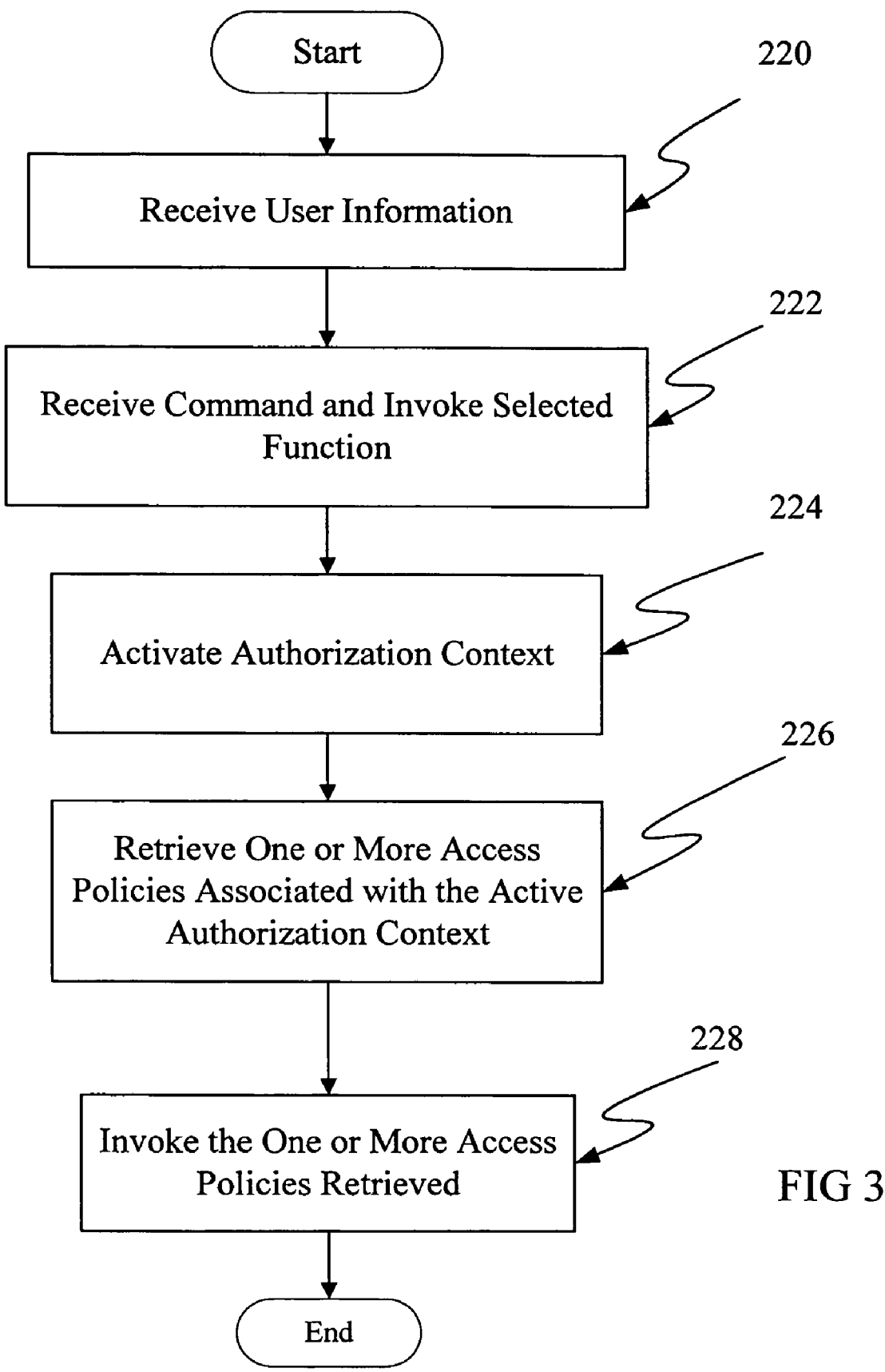
FIG. 3 is a flow chart illustrating steps to invoke one or more access policies based upon an authorization context.

FIG. 3 illustrates process steps for implementing authorization context based access as described in FIG. 2. In steps 220, the application receives user information, such as user identification, location and time. The user information can be received in response to a "log-on" prompt or other user identification or features. As shown in step 222, the application receives a command and invokes a user selected function. In step 224, the application activates an authorization context based upon the user information and/or the function invoked in step 222. It is important to note that the user information, time of day information etc. is not required, and in illustrative embodiments, the application can activate authorization contexts solely on the basis of the function or task that is being executed. In step 226, the application retrieves one or more access policies associated with the active authorization context 206 and in step 228 the application invokes the one or more access policies associated with the active authorization context 206.

For example, following a log-on process the application, may invoke one or more access policies for a main authorization context based upon a user role or function. From the main function or node, a user may invoke a "Browse Customer Directory" function in a business application example. Once the "Browse Customer Directory" function is invoked, the application activates a "Browse Customer Directory authorization context". One or more access policies associated with the "Browse Customer Directory authorization context" are invoked to control access to information or tasks through the "Browse Customer Directory Function" based upon the user's function or role.

The application context based access described in FIGS. 2-3 can be incorporated into a variety of applications using application or programming tools 229. The tools for example, include the framework to generate different object orientated programming modules, code, data or metadata to create the application framework to implement the access control described.

Figure 4:
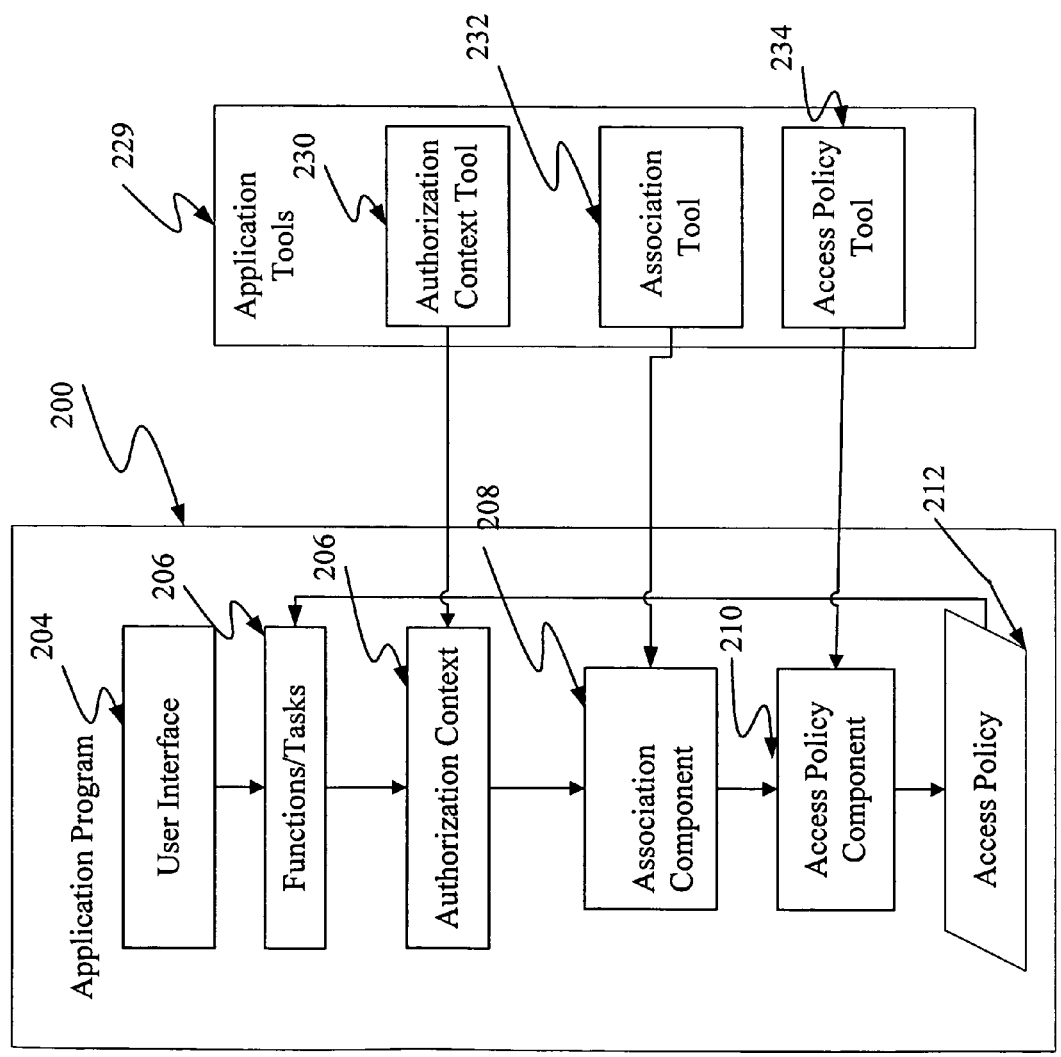
FIG. 4 is a block diagram illustrating an embodiment for creating a set of authorization contexts for an application program.

The tools in the embodiment illustrated in FIG. 4 include an authorization context tool 230. The authorization context tool 230 is configured to create a hierarchical authorization context framework for functions, tasks or other function or security boundaries of the application program. For example, in an illustrated embodiment, a banking application can have one or more teller functions and an authorization context can be defined relative to the one or more teller functions or other security or functional boundary of the application. Access to the teller functions of the authorization context is controlled based upon rules defined in the access policies to limit access to information or tasks of the application.

Other tools include an association tool 232 to generate the association component 208 and access policy tool 234 to generate the access policy component 210 to invoke one or more access policies based upon the active authorization context 206.

Figure 5:
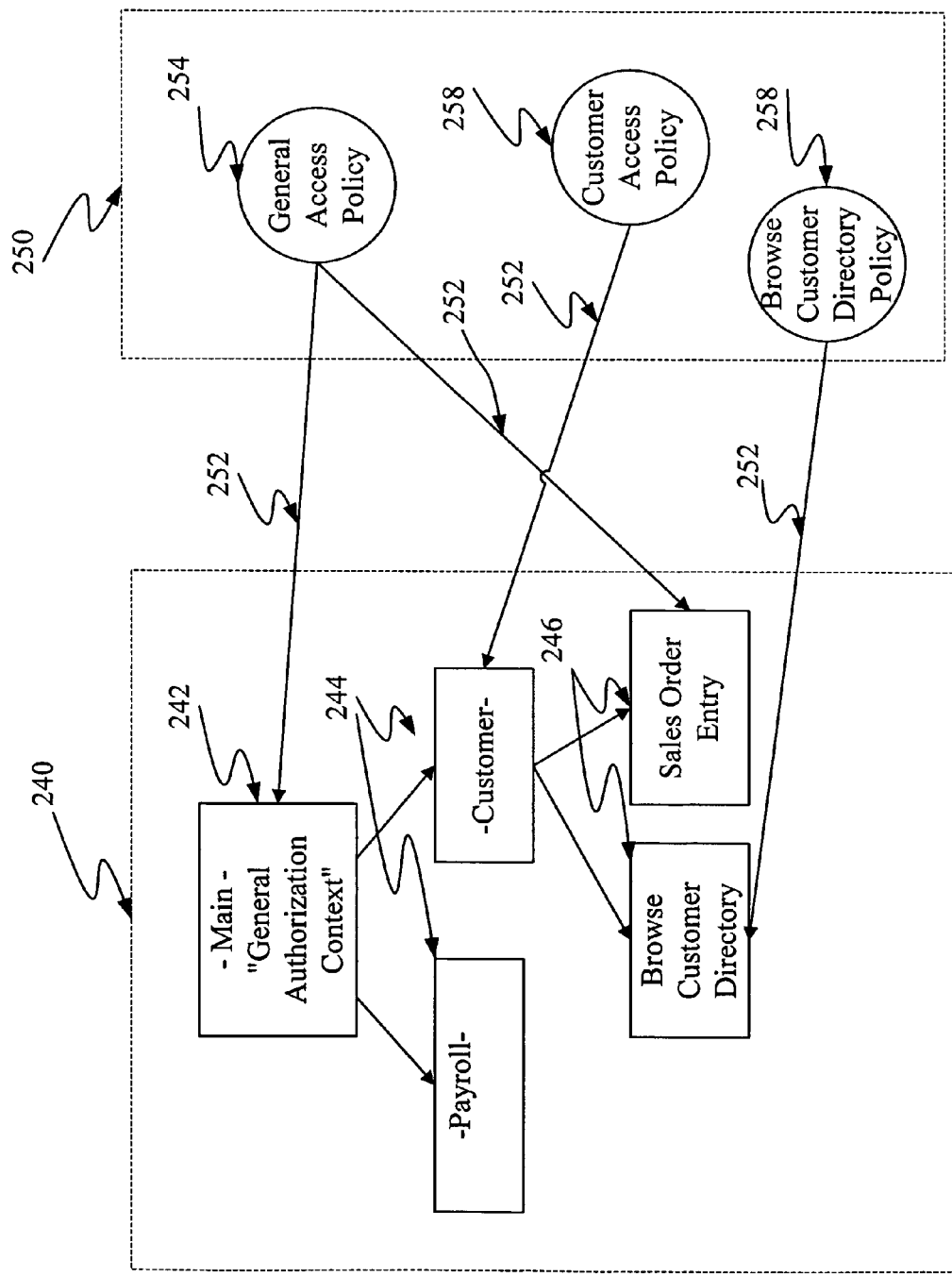
FIG. 5 is a block diagram illustrating a hierarchical structure for authorization contexts generated from an application tool.

FIG. 5 illustrates an embodiment of a hierarchical authorization context framework. The framework creates a set of authorization contexts 240 for hierarchical nodes of the application program. In the embodiment shown, the hierarchical nodes includes a main or base node 242 and a plurality of dependent nodes 244 and 246 that represent functions or task that are invoked through the main or base node.

In the illustrated embodiment for a business application, the dependent nodes 244 include "Payroll" and "Customer" functions which are invoked through the main or base node 242 and nodes 246 include "Browse Customer Directory". and "Sales Order Entry" functions which are invoked through the "Customer" node. The set of authorization contexts generated by tool 230 for the application nodes of FIG. 5 include an "General Authorization Context" "Payroll authorization context", "Customer Authorization context", "Browse customer directory authorization context" and "Sales order entry authorization context".

The authorization context framework generated by the tool 230 can have varied degrees of complexity depending upon the level of security or access control desired. In the illustrated embodiment, once created the set of authorization contexts 240 is not modifiable or edible through the application program 200.

As shown in FIG. 5, the application invokes one or more access policies from a set of access policies 250. Access policies in the set of access policies 250 are invoked through associations defined in the association component 208 as illustrated by lines 252 in FIG. 5. In illustrated embodiment, the set of access policies 250 includes "General Access Policy" 254, "Customer Access Policy" 256, and "Browse Customer Directory Access Policy" 258. The "General Access Policy" 256 is associated with the "General Authorization Context" and "Sale Order Entry Authorization Context". The "Customer Access Policy" 256 is associated with the "Customer Authorization Context" and the "Browse Customer Directory Access Policy" 258 is associated with the "Browse Customer Directory Authorization Context".

Access policies of the set of access policies 250 include one or more rules that control access to information or tasks for the authorization context. The access policies 250 can also include rules relating to whether or when a user may execute certain functions, delegate responsibilities to other users or print reports as well as rules defining access or task boundaries. For example, depending upon the authorization context 206, the policy rules can restrict access to portions of information or can grant "read-only" access to the user based upon the role of the user and the function or task the user is performing in that role. Thus, a particular user can have access to information while performing one task but not while performing another. For example in the embodiment illustrated in FIG. 5, the "Browse Customer Directory Access Policy" 258 restricts access to certain records or information based upon the user's role and/or the function performed.

Figure 6:
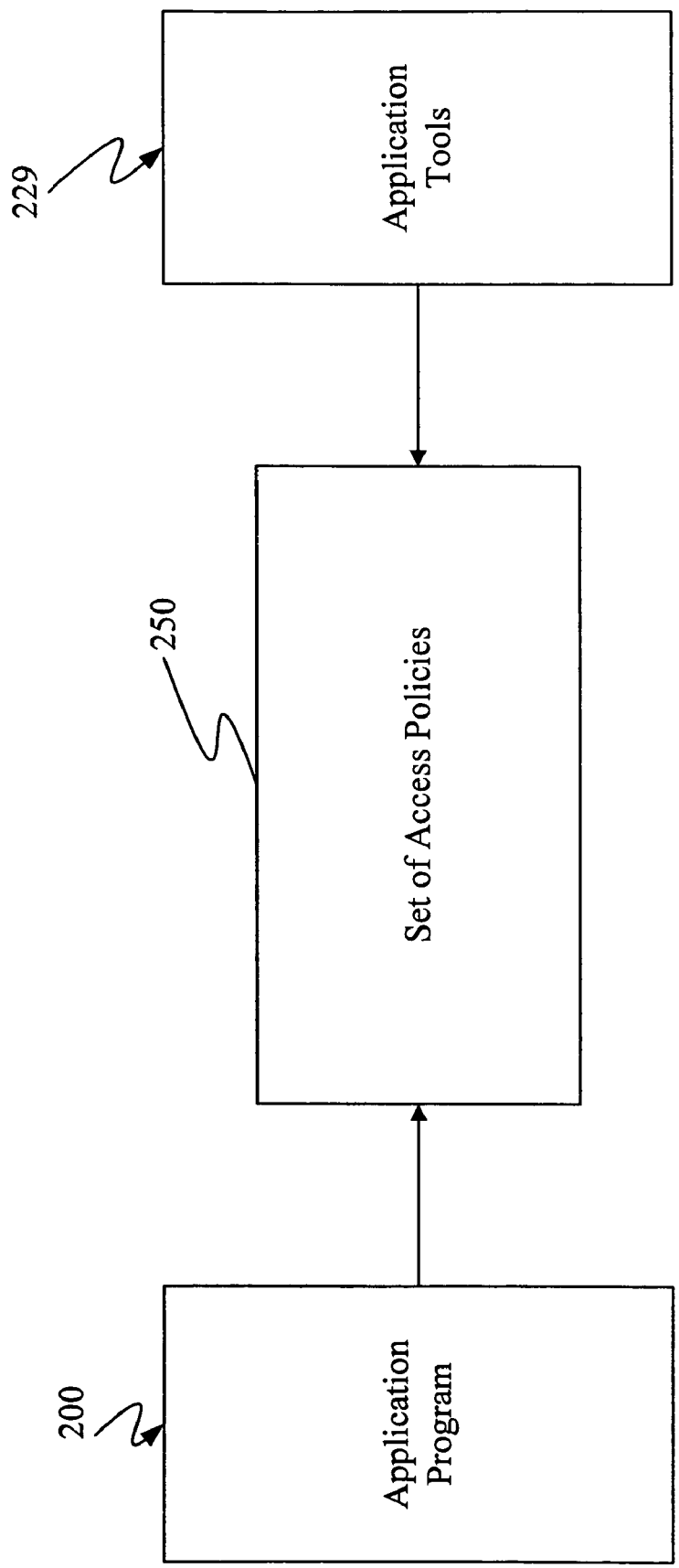
FIG. 6 is a block diagram illustrating creation of a set of one or more access policies through an application program or tool.

As shown in FIG. 6, the set of access policies and rules illustrated in FIG. 5 can be defined or created through the application program 200 or through application tools 229 based upon the criteria or structure of the application. The set of access policies and rules can be generated from a collection of form access policies or generated from custom policies created by a developer or administrator. The application can use a static set of access policies and policy rules or the application can include a set of access policy that can be modified or edited through a security administration console of the application program.

The associations implemented by the association component 208 can likewise defined through the application program 200 or application tools 229.

Figure 7:
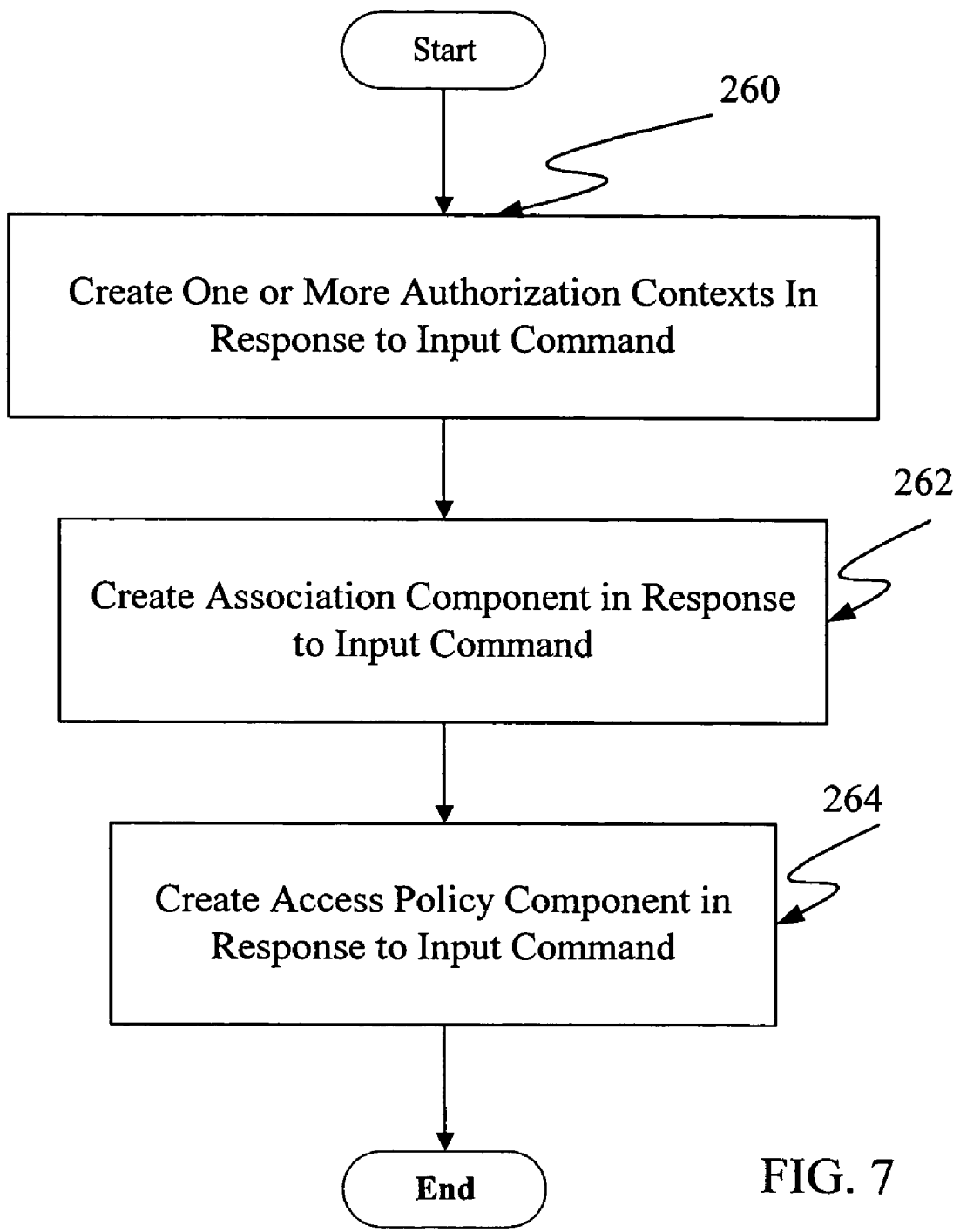
FIG. 7 is a flow chart illustrating steps for generating a set of authorization contexts which are used to invoke one or more access policies.

FIG. 7 is a flow chart illustrating steps for creating a set of authorization contexts 240 to invoke one or more access policies as previously described. As shown in step 260, a set of one or more authorization contexts is created in response to receipt of an input command. In step 262, an association component is created to associate one or more access policies from a set of access policies 250 to the authorization contexts 206 in response to receipt of an input command. In step 264, the access policy component 210 is created to invoke one or more access policies in response to receipt of an input command. As described, in illustrated embodiments, the set of authorization contexts 240 is developed based upon the hierarchical structure or boundaries of the application program to provide context sensitive access policies for different application functions or tasks based upon the user's role and/or function.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   creating a hierarchical structure of user selectable functions or tasks of an application including a hierarchical function or task of the application and a plurality of dependent functions or tasks of the application selectable through the hierarchical function or task of the application through an input device;
   assigning at least one authorization context to each of the user selectable functions or tasks in the hierarchical structure such that the at least one authorization context is activated in response to selection of the user selectable function or task;
   providing a set of access policies stored on one or more computer storage devices and retrievable via a processing unit, the set of access policies being separate from the authorization contexts assigned to the user selectable functions or tasks of the application and including one or more rules defining access criteria for the user selectable functions or tasks in relation to a user's identification or role; and
   associating a first one of the access policies with an authorization context assigned to a first one of the dependent functions or tasks, the first one of the access policies being different than a second one of the access policies that is associated with an authorization context assigned to the hierarchical function or task, the second one of the access policies also being associated with an authorization context assigned to a second one of the dependent functions or tasks such that the second access policy is invoked upon selection of the hierarchical function or task and upon selection of the second one of the dependent functions or tasks.

2. The method of claim 1 and further comprising:
   receiving a command from the input device to create an association component to associate the one or more authorization contexts to the one or more access policies on the one or more computer storage devices;
   creating the association component to associate the one or more authorization contexts to the one or more access policies;
   receiving a command from the input device to create an access policy component to invoke the one or more access policies based upon association to the one or more authorization contexts; and
   creating the access policy component to invoke the one or more access policies.

3. An application including computer executable instructions stored on the one or more computer storage devices and executable by a processing unit to implement the method of claim 1.

4. The method of claim 1 wherein the one or more access policies are defined from a collection of form access policies.

5. The method of claim 1 wherein providing the one or more access policies comprises:
   receiving a command from the input device to create the one or more access policies; and
   creating the one or more access policies separate from the one or more authorization contexts in response to the input command.

6. The method of claim 1 wherein the one or more access policies associated with the one or more authorization contexts include different access rules based upon a user's function or role.

7. The method of claim 1 and comprising:
   storing one or more associations of the one or more authorization contexts with the one or more access policies on the one or more computer storage devices.

8. The method of claim 1, wherein the second one of the dependent functions or tasks accesses different data stored in a database associated with the application program than the hierarchical task or function.

9. An application tool including instructions stored on one or more computer storage media and executable by a processing unit to implement components comprising:
   an authorization context tool component configured to provide one or more authorization contexts and a context framework component configured to create an authorization context framework for a hierarchical structure of user tasks or functions of an application that are selectable through one or more user interfaces of the application using an input device, wherein the authorization context framework includes one or more authorization contexts associated with one or more of the user tasks or functions;
   an association tool component configured to create an association component to associate one or more access policies defining one or more access rules stored on the one or more computer storage devices to the one or more authorization contexts; and
   an access policy tool component configured to provide the one or more access policies including the one or more access rules separate from the one or more authorization contexts and configured to invoke the one or more access policies based upon an association of the one or more access policies with an active authorization context that is associated with a first user task or function of the application, the invoked one or more access policies permitting a particular user to have access to information in the active authorization context that is associated with the first user task or function of the application but denying access to the information to the particular user in an authorization context that is associated with a second user task or function of the application that is different than the first user task or function of the application.

10. The tool of claim 9 wherein the access policy tool component is configured to select one or more access policies from a set of form access policies.

11. The tool of claim 9 wherein the access policy tool component is configured to receive user input to define the one or more access rules for the one or more access policies.

12. The tool of claim 9 wherein the association tool and access policy tool components generate different object orientated programming modules or code to create the association to the one or more access policies to invoke the one or more access policies based upon the active authorization context.

13. The tool of claim 9 wherein the access policies include rules that restrict access to read only access depending upon a user role or function.

14. The tool of claim 9 wherein the one or more authorization contexts are associated with different use tasks or functions and the one or more authorization contexts are associated with different access policies having different access rules depending upon a user's role or function.

15. A method comprising:
   receiving a first command to invoke a first task or function of a user interface from an input device;

processing the first command via a processing unit and retrieving a first authorization context assigned to the first task or function;

retrieving one or more access policies including one or more access rules providing access criteria in relation to a user's identification or role, associated with the first task or function through the first authorization context following retrieval of the first authorization context;

invoking the one or more access policies associated with the first authorization context and applying the one or more access rules of the one or more access policies;

receiving a second command to invoke a second task or function different from the first task or function from the input device, the first task or function and the second task or function both being associated with and executed by a same application;

processing the second command via the processing unit and retrieving a second authorization context different from the first authorization context assigned to the second task or function;

retrieving the one or more access policies associated with the second task or function through the second authorization context;

invoking the one or more access policies associated with the second active authorization context and applying the one or more access rules of the one or more access policies associated with the second authorization context; and editing the one or more access policies associated with the first task and the one or more access policies associated with the second task utilizing a security administration console of the same application.

16. The method of claim 15 and comprising:
receiving user function and user role information; and
utilizing the user function and user role information to apply the one or more access rules of the one or more access policies associated with the first or second authorization context.

17. The method of claim 15 wherein, prior to invoking the one or more access policies, the method comprises:
creating the one or more access policies.

18. The method of claim 15 wherein prior to invoking the one or more access policies comprising:
defining the one or more access rules for the one or more access policies.

19. An application program including computer executable instructions stored on one or more computer storage devices and executed by a processing unit to implement the method of claim 15.

20. The method of claim 9 wherein the first or second task or function corresponds to a payroll function or task or a customer task or function and the step of activating the first or second authorization context includes the step of determining the first or second authorization context associated with one of the payroll or customer tasks or functions and invoking the one or more access policies associated with the one of the payroll or customer tasks or functions through the first or second authorization context.

* * * * *